United States Patent [19]

Rosell

[11] Patent Number: 4,646,868
[45] Date of Patent: Mar. 3, 1987

[54] POWER ASSISTED STEERING SYSTEM WITH RACK AND PINION PARTICULARLY OF THE TYPE WITH CENTRAL OUTPUT

[75] Inventor: Jorge E. Rosell, Barcelona, Spain

[73] Assignee: Bendiberica S.A., Barcellona, Spain

[21] Appl. No.: 884,864

[22] Filed: Jul. 11, 1986

Related U.S. Application Data

[63] Continuation of Ser. No. 807,109, Dec. 9, 1985, abandoned, which is a continuation of Ser. No. 591,632, Mar. 20, 1984, abandoned.

[30] Foreign Application Priority Data

Mar. 22, 1983 [ES] Spain ................................. 521288
Sep. 21, 1983 [ES] Spain ................................. 525777

[51] Int. Cl.$^4$ .............................................. B62D 5/06
[52] U.S. Cl. ................................. 180/148; 92/98 D; 74/388 PS; 74/422
[58] Field of Search ............... 74/388 PS, 89.17, 422; 180/148, 154, 155, 156, 157; 251/250, 58, 61; 92/98 D

[56] References Cited

U.S. PATENT DOCUMENTS

| | | | |
|---|---|---|---|
| 315,051 | 4/1885 | Miller | 74/422 |
| 498,545 | 5/1893 | Gold | 251/250 X |
| 674,213 | 5/1901 | Oldfield | 74/422 |
| 886,208 | 4/1908 | Hadley | 251/250 |
| 1,872,714 | 8/1932 | Farley | 180/148 |
| 2,338,271 | 1/1944 | Ulanet | 74/422 |
| 2,829,500 | 4/1958 | Butler | 92/98 D |
| 3,786,938 | 1/1974 | Kirham | 74/422 |
| 3,969,991 | 7/1976 | Comstock et al. | 92/98 D X |
| 4,070,946 | 1/1978 | Sandvilz et al. | 92/98 D X |
| 4,251,050 | 2/1981 | McInerney | 92/98 D X |
| 4,406,213 | 9/1983 | Haar | 92/98 D X |
| 4,428,450 | 1/1984 | Stenstrom et al. | 180/148 |

FOREIGN PATENT DOCUMENTS

| | | | |
|---|---|---|---|
| 2228580 | 1/1974 | Fed. Rep. of Germany | 92/98 D |
| 421775 | 12/1974 | U.S.S.R. | 92/98 D |

Primary Examiner—James C. Yeung
Attorney, Agent, or Firm—Leo H. McCormick, Jr.; Ken C. Decker

[57] ABSTRACT

The power assisted steering system, particularly of the type with central output, incorporates a body (10) forming a housing for a cooperating pinion (12) and rack (11) assembly. The rack is guided in the central portion (10$_1$) of the body and is joined by a rod (40) to at least a first piston (30a) movable in a cylinder consisting of a component in the shape of a cylindrical bell (20a, 20b) attached to one end of the body (10) and itself consisting of a rolling membrane (31) joined at its periphery to the component in the shape of a bell, and of a tubular support component (24) fixed to the rod (40) and coaxial with the latter. Also described are variants with a twin circuit incorporating a second piston carried by the rod and sliding so that it is sealed relative to a central stationary component passing longitudinally through the rack.

5 Claims, 9 Drawing Figures

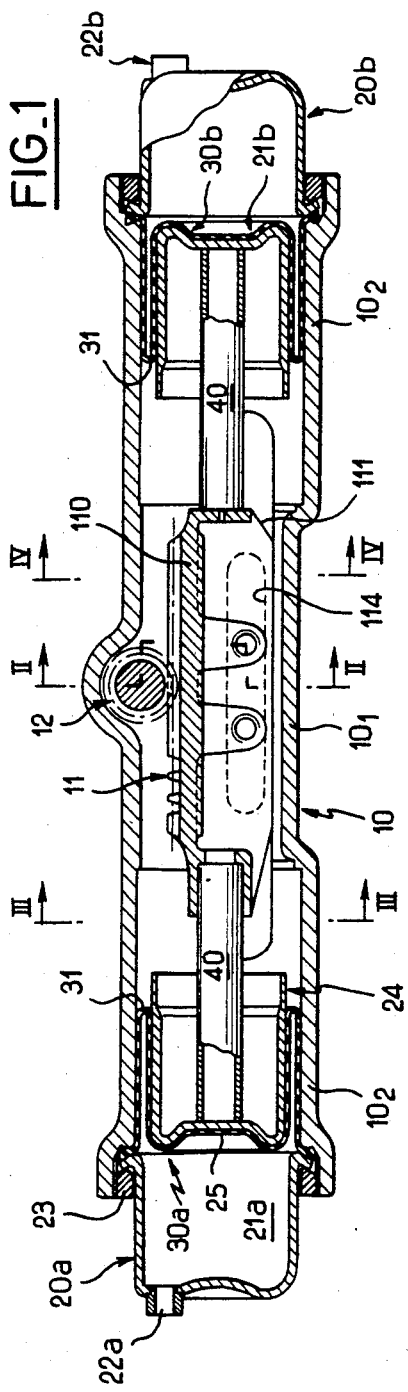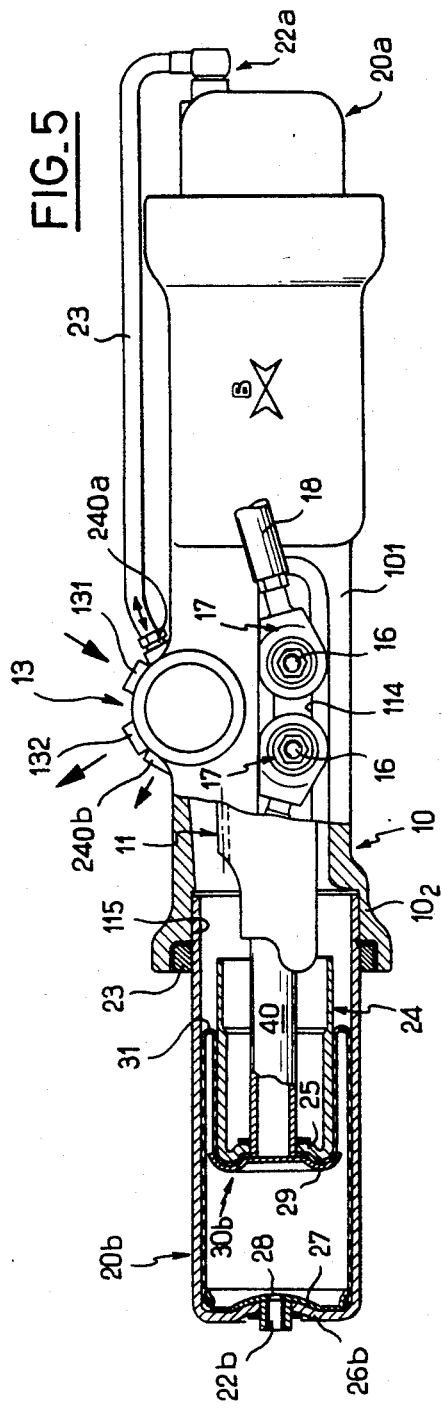

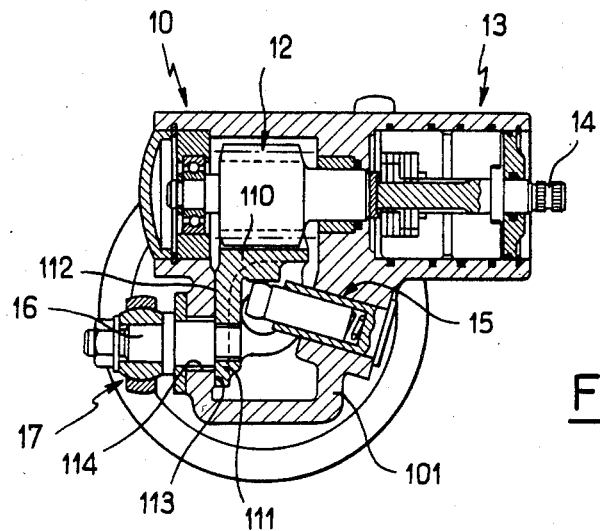
FIG_2
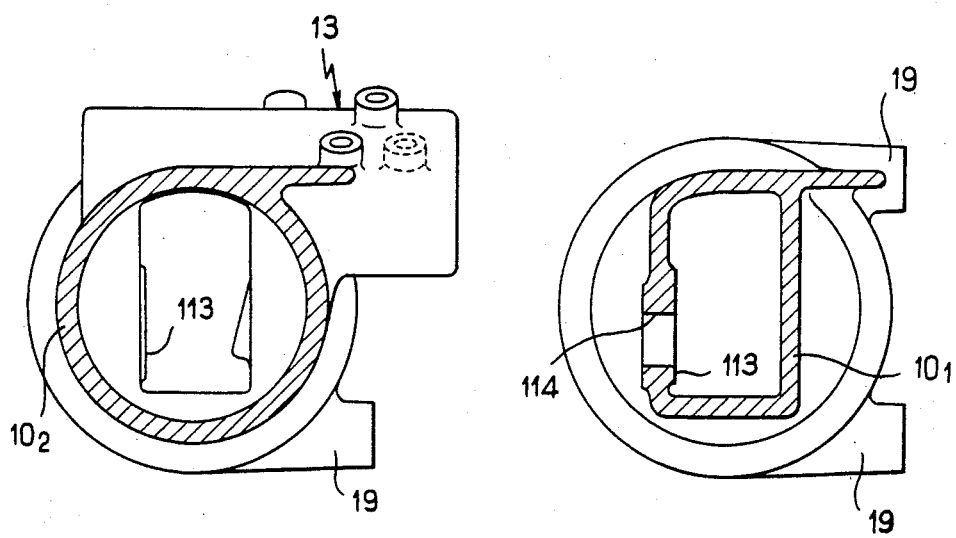
FIG_3  FIG_4

POWER ASSISTED STEERING SYSTEM WITH RACK AND PINION PARTICULARLY OF THE TYPE WITH CENTRAL OUTPUT

This is a continuation of co-pending application Ser. No. 807,109 filed Dec. 9, 1985, now abandoned, which is a continuation of application Ser. No. 591,632 filed Mar. 20, 1984, now abandoned.

The presesnt invention concerns power assisted steering system for vehicles, particularly of the type with central output, incorporating a body forming a housing for a cooperating pinion and rack assembly, at least one cylinder extending the body in a direction parallel to the rack, at least a first piston means situated in the cylinder and joined to the rack by a rod, and means for selectively admitting a fluid under pressure into the cylinder, at least on the side of the piston means opposite the rod.

Power assisted steering systems with rack and pinion generally incorporate a double-acting piston means associated with the rack and sliding in a single cylinder situated on one side of this rack. Most frequently, the actuating rods of the steering rods system are joined, respectively, to the end of the rack opposite the piston means, and to one end of the rod of the piston means projecting beyond the latter and passing through the front wall of the cylinder opposite the rack. Power assisted steering devices of the said type with central output are also known, and to which the present invention particularly refers, in which the actuating rods are joined to the piston rod/rack assembly in an intermediate zone of this assembly, either in the region of the rod, as in the document FR-A-1,108,056, or in the region of the piston itself (lengthened), as in the document U.S. Pat. No. 3,312,148. However, as it appears from the two documents in question, the piston means of the sliding type require, firstly, very accurate machining of the cylinder bore and also, an equally accurate alignment of the axes of the rack, of the piston rod and of the cylinder, which contributes to increase greatly the production costs of such devices.

The aim of the present invention is to propose a power assisted steering arrangement of the type mentioned above of simplified and lightened construction, permitting considerably reduced manufacturing costs while ensuring reliable operation, and offering great versatility of variants which can be produced.

To achieve this, according to a characteristic of the present invention, the cylinder consists of a component in the shape of a cylindrical bell, advantageously made by deep stamping, attached to the body, the first assistance piston means consisting of a rolling membrane joined, at its periphery, to the component in the shape of a cylindrical bell, and of a tubular support component, fixed to the rod connected to the rack, and coaxial with this rod.

According to a more specific characteristic of the invention, the power assisted steering incorporates a pair of such first piston means situated in opposition, each in a component in the shape of a cylindrical bell, at each end of the rack, which is joined to the rods actuating the wheels by connection means passing through the lateral wall of the body.

Such an arrangement enables the sliding relationship between the piston means and its cylinder to be eliminated, and thus allows the components in the shape of a cylindrical bell, forming the cylinders, to be manufactured by simple stamping, without requiring further machining, likewise for the tubular support component, thus eliminating any alignment problems.

According to another characteristic of the invention, the rack is guided axially in a central zone of the body of corresponding profile, the tubular support component/rod assembly being mounted overhanging the adjacent end of the rack.

According to another characteristic of the invention, the rack incorporates a bearing surface perpendicular to its toothed zone and sliding against a corresponding wall of the body.

Such an arrangement enables the manufacture of the device to be simplified further, limiting the surfaces which require precision machining strictly to a minimum.

The power assisted steering arrangement according to the invention also allows a control arrangement of the twin circuit type which is particularly compact and whose manufacturing cost is low.

Thus, according to a characteristic of the invention, the power assisted steering particularly of the type with central output, incorporating a body forming a housing for a cooperating rack and pinion assembly, at least one cylinder consisting of a component in the shape of a cylindrical bell being attached to the body so as to extend the latter in a direction parallel to the rack, and a first piston means with rolling membrane, situated in the cylinder, and joined to the rack by a hollow rod, incorporates a second piston means carried by the said rod and sliding in a sealed manner relative to a stationary central component.

According to a particular characteristic of the invention, the stationary central component, advantageously hollow, is connected by an articulated connector to the component in the shape of a cylindrical bell and passes longitudinally through the rack.

Other characteristics and advantages of the present invention will emerge from the following description of embodiments, given by way of illustration but not limiting in any way, with reference to the accompanying drawings, in which:

FIG. 1 shows, in longitudinal section, a first embodiment of a power assisted steering with rack and pinion according to the invention;

FIGS. 2, 3 and 4 are views in respective transverse section along the section planes II—II, III—III, IV—IV in FIG. 1;

FIG. 5 is a view, in partial longitudinal section, of a variant of embodiment of a power assisted steering according to the preceding figures;

In the following description and in the drawings, identical or similar components in the different embodiments carry the same reference numbers, with prime suffixes where appropriate.

Figure 6:
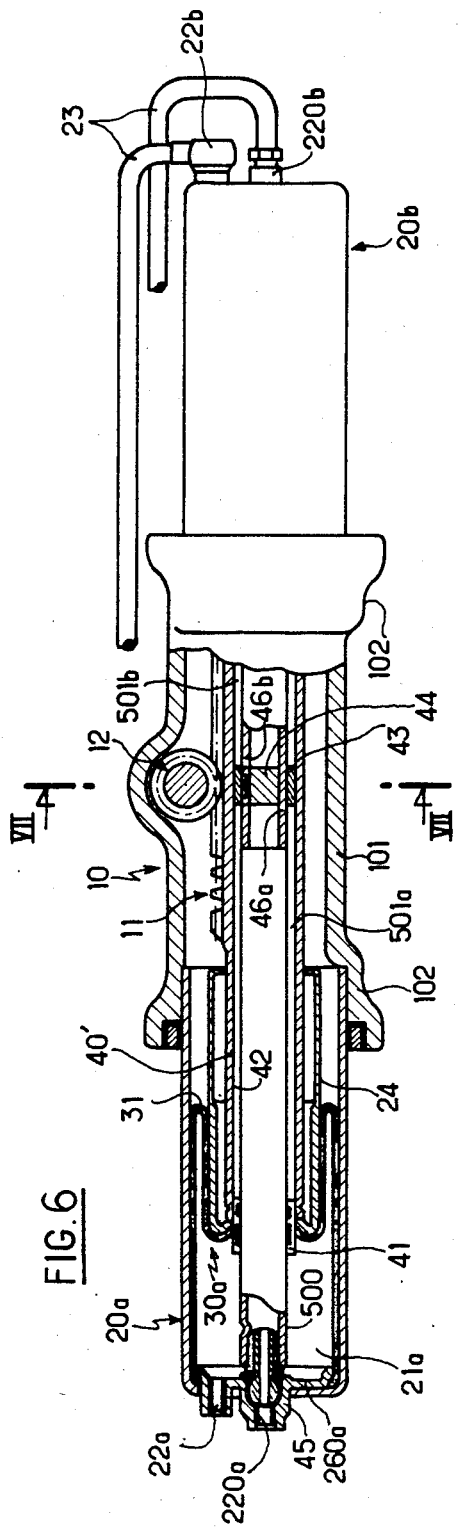
FIG. 6 is a view, in partial longitudinal section, of a first embodiment of a power assisted steering with twin circuit according to the invention.
Figure 7:
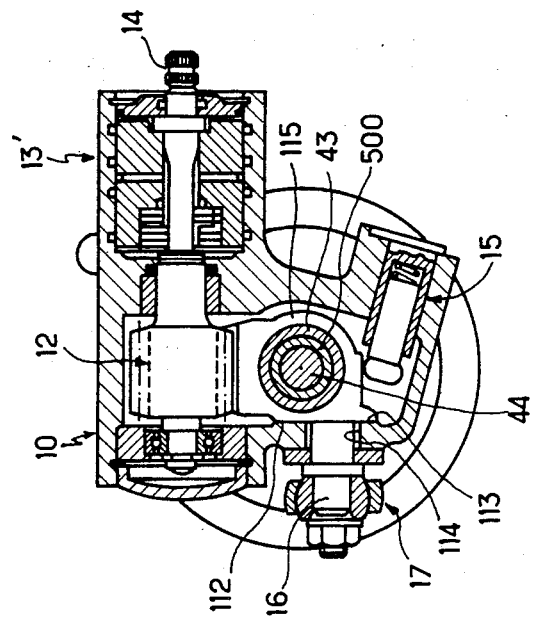
FIG. 7 is a view in transverse section along the section plane VII—VII in FIG. 6.

The power assisted steering with central output shown in FIG. 1 generally consists of an elongated hollow, cast steering body or casing 10 incorporating, as may be seen more clearly in FIGS. 2 to 4, a central portion 10₁ with an essentially parallelepipedal internal profile, and two cylindrical end portions 10₂. In the body 10 a rack block 11 is mounted, having a transverse profile (FIG. 2) in the shape of an L, thus defining a wing 110 forming the teeth of the rack and an orthogonal wing 111 incorporating a flat external ground surface 112 bearing and sliding against an internal surface 113, also flat and ground, of the wall of the central portion 10₁ of the body 10. The rack teeth of the wing 110 cooperate in mesh with a pinion 12 mounted so as to rotate in the body 10 and actuated, via a coupling having a dead travel zone and a distribution valve 13, advantageously also mounted in the body 10, by an input component 14 intended to be connected to the steering column of a vehicle, the pinion 12 advantageously being directly connected to the output component of the valve 13. The wing 110 bears, by its surface opposite the rack teeth, against an elastic bearing device 15 mounted in a bore in the body 10 having an axis lying in a plane perpendicular to the axis of the rods 40 and orientated along a direction which lies in the quadrant between the two wings of the rack 11. According to a feature of the invention, the wall of the central portion 10₁ of the body 10 forming the bearing surface 113 is pierced by an elongated opening 114 through which extend so as to slide the shaft components 16, fixed to the wing 111, and whose portions projecting outside the body 10 support articulated connectors 17 for connection to rods 18 which control the orientation of the steerable wheels of the vehicle.

In accordance with a feature of the invention, in the flared ends of the cylindrical end zones 10₂ of the body 10 are mounted, coaxially with the body 10, components in the shape of a cylindrical bell 20a, 20b, respectively, advantageously made by deep stamping in steel or light alloy in such a way that each defines internally a piston chamber 21a or 21b for a piston means 30a or 30b, each component in the shape of a cylindrical bell 20a, 20b being provided at its end with a connector 22a, 22b for connection, via tubing such as 23, to a distribution outlet 240a or 240b of the valve 13, respectively, also conventionally provided with an inlet connector 131 and a return connector 132 intended to be connected to a source of fluid under pressure and to a reservoir (not shown), respectively.

In accordance with the invention, each piston means 30a or 30b consists of a rolling membrane 31 firmly fixed to the rack block 11 by a rod 40, advantageously hollow. In the embodiment shown in FIG. 1, the outer periphery of the membrane 31 is mounted between the shoulder at the bottom of the flared end of the end portion 10₂ of the body 10 and the annular edge, folded outwards, of the component in the shape of a bell 20a or 20b, the latter being retained in the flared end of the end zone 10₂ by a threaded ring 23. In the embodiment shown in FIG. 1, the fixing between the membrane 31 and the rod 40 is obtained by means of a tubular support component 24 coaxial with the rod 40 and fixed to the latter at its bottom in the shape of a dish 25, over the whole outside surface of which the central shaped zone of the membrane 31 is applied. The rod 40 is fixed to the end of the rack block 11 either by insertion, as shown in the left-hand portion of FIG. 1, or by riveting or screwing to the end as shown in the right-hand portion of this same FIG. 1. Thus, in accordance with the aim of the invention, the piston means 30a or 30b do not incorporate any portion in sealed sliding with the body 10 or the end components in the shape of a bell 20a or 20b the piston means being supported so as to overhang, via the rod 40, from the rack block 110 which is, however, guided and retained in axial sliding against the internal surface 113 of the body 10, which enables the precision machining to be limited to the only sliding surfaces in contact 112 and 113. It will be noted that each tubular support component 24 forms a bearing surface for the associated rolling membrane 31, thus avoiding the risk of damage to the latter. In FIGS. 3 and 4, the bosses 19 of the body 10 which serve for mounting the latter onto the chassis of the vehicle, will also be noted.

In the embodiment shown in FIG. 5, each component in the shape of a cylindrical bell 20a or 20b is inserted into a bore 115 of enlarged diameter formed in the cylindrical end portion 10₂ of the body 10 and is locked in position by an externally threaded ring 23, the periphery of the membrane being, in this case, retained against the periphery of the bottom 26a or 26b of the cylindrical component 20a or 20b by an elastic profiled bottom plate 27 pierced with an orifice 28 aligned with the connector 22a or 22b. In this embodiment, the rod 40 passes through a central orifice formed in the bottom 25 of the tubular support component 24, and the inner periphery of the membrane 31 is trapped against this bottom 25 by an external profiled plate 29 firmly fixed to the outer end of the rod 40. The device shown in FIG. 5 is otherwise completely identical to that described above with reference to FIGS. 1 to 4.

The embodiment shown in FIG. 6 corresponds in many respects to the embodiment shown in FIG. 5 described above. If the rack block 11 still incorporates a flat surface 112 perpendicular to the rack teeth and sliding so as to bear against a corresponding flat ground surface 113 of the central portion 10₁ of the body 10 of the power assisted steering, the rack block has, in this case, a general cylindrical configuration and incorporates, in particular, two tubular axial extensions 40', each joined to the annular bottom portion of the tubular support component 24 of the first piston means 30a or 30b with rolling membrane 31, by the intermediary of a bush 41 provided with sliding seals and sliding on a central hollow rod 500 passing through the assembly of the power assisted steering device. As may be clearly seen in FIG. 6, the rack block 11 (including the tubular extensions 40') is formed with a central bore 42 passing through, with which an annular seal structure 43 cooperates in sealed sliding, the latter being fixed peripherally on the middle zone of the hollow rod 500. In the region of this middle zone, the hollow rod 500 is divided internally into two separate, and axially opposed, passages by a sealed separating block 44. To overcome the problems of possible misalignment between the rack block 11 and the end components in the shape of a cylindrical bell 20a, 20b, the fixed central guide tube 500 is joined to the attached bottom 260a or 260b of these components in the shape of a cylindrical bell 20a or 20b (and serving, in this embodiment, for mounting the outer periphery of the membrane 31) by means of a hollow connector with a ball joint 45 lockable in the appropriate mounting position and aligned with a connector 220a, 220b of the bottom 260a or 260b serving for the connection to the corresponding pair of distribution connectors 240a, 240'a or 240b, 240'b of the distribution valve 13', also arranged to be of the type with twin circuit so as to supply sequentially, or in a complementary manner in opposition, working fluid under pressure into the primary annular chamber 501a or 501b defined between the stationary tube 500 and the wall of the bore 42 of the rack block so as to push the sleeve or second piston means 41 outwards, or into the secondary chambers 21a, 21b defined in the ends of the components in the shape of a cylindrical bell 20a or 20b so as to push the first piston means with a membrane 31 inwards. For this purpose, on each side of the sealed internal partition 44, the stationary tube 500 incorporates radial holes 46a or 46b so as to put the corresponding primary chamber 501a or 501b into communication with the associated connector 220a or 220b via the corresponding internal passage formed by the tube 500. According to a feature of the invention, it will be noted that the embodiment shown in FIG. 6 occupies a reduced operational space, corresponding to 6×½, where ½ is the total half-travel of the displacement of the output components 16, 17, each side of the central rest position.

Figure 8:
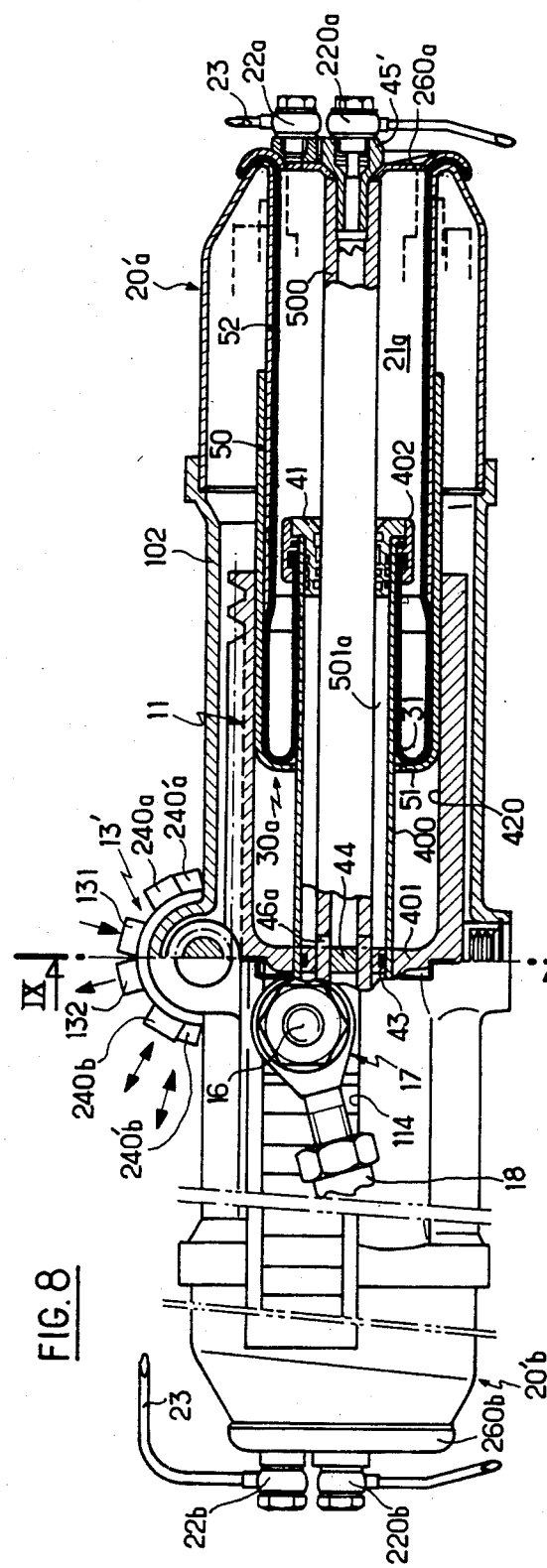
FIG. 8 is a view, also in partial longitudinal section, of another embodiment of a power assisted steering with twin circuit according to the invention.
Figure 9:
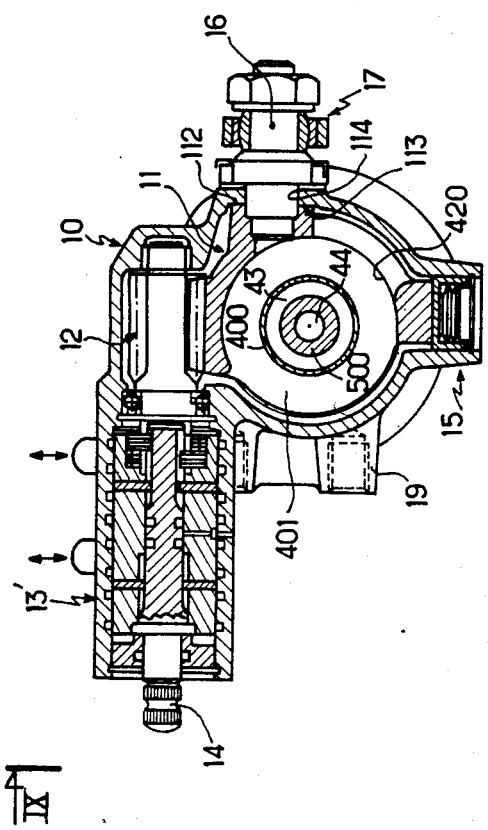
FIG. 9 is a view in transverse section along the line IX—IX in FIG. 8.

The embodiment shown in FIGS. 8 and 9 enables this total operational occupied space to be further reduced to a value 4 x. This reduction is obtained by partially combining the first piston means with rolling membrane 30a (30b) with the rack block itself. As may be seen, the rack block 11 has also a general cylindrical configuration in this case, but of enlarged diameter and of a length reduced to the length of the toothed portion of the rack, the internal bore 420 of the rack block being interrupted in its middle zone by an annular partition component 401, to which is joined a tubular rod 400 carrying, at its outer end, the sliding sleeve 41 forming the second piston means sliding on the central stationary hollow rod 500. In this embodiment, the inner periphery of the membrane 31 is fixed onto the tube 400, in line with the bush 41, by means of an annular cover 402 and this membrane 31 lies folded back in the annular space formed in the bore 420 by the tube 400, the first piston means consisting of this membrane 31 incorporating a tubular piston wall 50 sliding by its external periphery in the bore 420 and provided, at its inner end, with a portion folded down 51, protecting and following the shape of the fold of the membrane 31, whose outer periphery is trapped between the outer end of the component in the shape of a cylindrical bell 20'a or 20'b and an attached bottom 260'a, 260'b, carrying the connector 22a or 22b and serving for the fixing, with at least a degree of initial freedom, of the end of the hollow rod 500 by the intermediary of a conical connector 45' carrying the other connector 220a or 220b. The sliding of the wall 50 is also arranged, internally, on a cylindrical sleeve 52 formed by folding inwards the metal sheet of the component in the shape of a cylindrical bell 20'a, 20'b, the axial extension of this inner tube 52 being such that it extends as far as the bore 420 of the rack block 11 when the latter is in the central rest position.

Although the present invention is described relative to particular embodiments, it is not limited by them, but on the contrary, is capable of modifications and variants which will be apparent to a person versed in the art.

I claim:
1. In a steering system for steering at least one dirigible wheel of a vehicle, a power assist apparatus comprising:
    an elongated hollow housing having axially opposite first and second ends and a lateral wall;
    a rack body having axially opposite ends and an intermediate toothed zone with rack teeth and reciprocable axially within said housing;
    said rack body having a substantially planar outer surface portion in axial guiding engagement with a mating inner surface of said housing, said outer surface portion extending at an angle, in cross-section, relative to said toothed zone;
    a pinion gear journaled within said housing and in meshing engagement with said rack teeth and actuatable by an input member;
    at least a pair of first piston means, each of said first piston means being connected to a respective said end of said rack body by a rod and arranged within corresponding cylinders mounted respectively adjacent said first and second ends of said housing and in prolongation thereof, each of said cylinders consisting of an integral component in the shape of a tubular bell having an annular open end joined to said housing and a bottom opposite said open end, each of said first piston means having a smaller diameter than said cylinder with a tubular support member secured coaxially to one end of the corresponding said rod opposite said rack body, and a rolling membrane having a central portion and a peripheral portion, said rolling membrane being connected at said central portion to said support member and by its peripheral portion to the corresponding bell-shaped cylinder to define therein the limits of an operating chamber, at least one orifice in said bottom of each said bell-shaped cylinder for admitting fluid under pressure into said operating chamber from a control member in response to said input member, said fluid acting on said rolling membrane to provide a force for moving said piston means and said rack body connected thereto; and
    means for connecting said rack body to an output linkage, said connecting means extending outwardly through an elongated aperture formed in said lateral wall of said housing.
2. The system of claim 1, wherein said pinion gear is substantially centrally axially located in said housing.
3. The system of claim 2, wherein said connecting means are provided adjacent said toothed zone.
4. The system of claim 3, wherein said inner surface of said housing is formed on said lateral wall.
5. The system according to claim 1 wherein said rack body has a transverse profile in the shape of an L, a first branch of the L forming the toothed zone and the second branch of the L forming said outer surface.

* * * * *